(12) United States Patent
Mallory

(10) Patent No.: US 6,181,142 B1
(45) Date of Patent: Jan. 30, 2001

(54) NONLINEAR CURRENT MIRROR FOR LOOP-GAIN CONTROL

(75) Inventor: Roy E. Mallory, Bedford, MA (US)

(73) Assignee: ADE Corporation, Westwood, MA (US)

( * ) Notice: Under 35 U.S.C. 154(b), the term of this patent shall be extended for 0 days.

(21) Appl. No.: 09/119,803

(22) Filed: Jul. 21, 1998

(51) Int. Cl.$^7$ .................................................. G01R 27/26
(52) U.S. Cl. ................................ 324/661; 324/768
(58) Field of Search ............................. 324/661, 662, 324/679, 687, 72.5, 541, 663, 118, 768; 327/541, 543; 323/315; 330/288

(56) References Cited

U.S. PATENT DOCUMENTS

| | | | |
|---|---|---|---|
| 4,364,046 | * 12/1982 | Ogasawara et al. | 340/870.37 |
| 4,649,336 | * 3/1987 | Bindner et al. | 324/118 |
| 4,658,254 | * 4/1987 | Walton | 340/870.37 |
| 4,814,691 | * 3/1989 | Garbini et al. | 324/118 |
| 5,059,916 | * 10/1991 | Johnson | 324/713 |
| 5,070,302 | * 12/1991 | Marcus et al. | 324/662 |
| 5,570,060 | * 10/1996 | Edwards | 327/541 |
| 5,708,368 | * 1/1998 | Mallory | 324/663 |

OTHER PUBLICATIONS

Microelectronic circuit. Sedra/Smith fourth edition, 1997.*

* cited by examiner

Primary Examiner—Safet Metjahic
Assistant Examiner—Vincent Q. Nguyen
(74) Attorney, Agent, or Firm—Weingarten, Schurgin, Gagnebin & Hayes LLP

(57) ABSTRACT

A nonlinear current mirror for loop-gain control incorporates a resistor in one section of a current mirror which produces a nonlinear transfer function for the current mirror. When the nonlinear current mirror is included as part of a capacitive displacement gauge the gain of the gauge varies as a function of the input to the current mirror which compensates for the change in gain caused by the probe capacitance. Accordingly, the distance range and/or frequency response of the capacitive displacement gauge is increased.

9 Claims, 2 Drawing Sheets

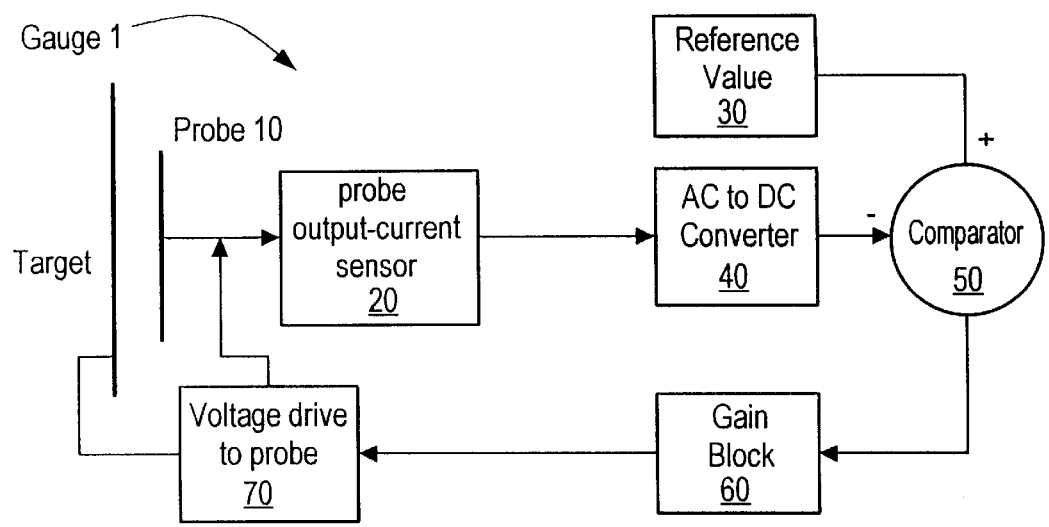
FIG. 1
PRIOR ART
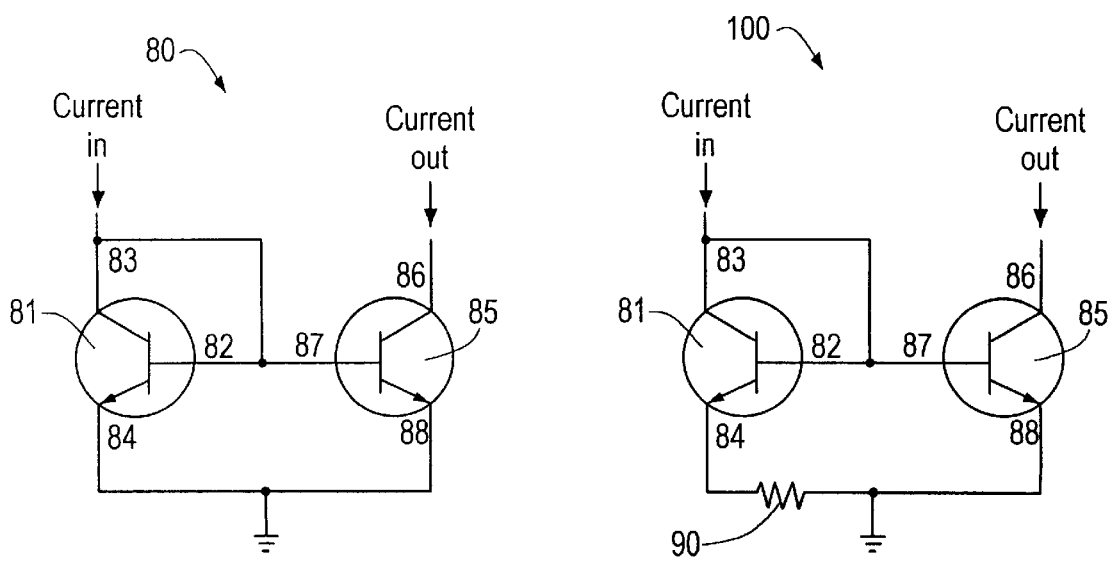
FIG. 2
PRIOR ART
FIG. 3

NONLINEAR CURRENT MIRROR FOR LOOP-GAIN CONTROL

BACKGROUND OF THE INVENTION

Capacitive displacement gauges are known in the art. For most uses of such equipment, a probe of the capacitive displacement gauge is placed in close proximity to a target so that the area of the probe is parallel to the target. Changes in capacitance between the probe and target that result from any change in distance between the probe and the target are converted into an electrical signal that is utilized in order to accurately measure the change in distance between the probe and the target. It is most convenient to drive a capacitive displacement sensor with a constant current so that the sensor's output (in this case, the capacitor voltage) is a linear function of the distance between the probe and the target being measured by the gauge.

The open-loop gain of the capacitive displacement gauge is directly proportional to the probe capacitance, $C_p$. Since the probe operates over some distance range the loop gain of the gauge will change as the probe-to-target distance changes. The distance ratio will produce a capacitance ratio of the same magnitude.

The changing loop gain of the gauge causes an undesirable change in the frequency response of the loop. At the crossover frequency (or gain-bandwidth product) of the loop, defined as the frequency at which the magnitude of the loop gain equals 1, the slope of the loop gain's rolloff must be less than 40 dB/decade. For a typical distance ratio of 4:1, a loop with a 20 dB/decade rolloff would exhibit a 4:1 change in frequency response; for a loop with a 40 dB/decade rolloff, the frequency would change by 2:1. This change in frequency is undesirable.

It would be desirable to have a device with a nonlinear transfer function such that the change in frequency response due to the changing loop gain of the probe which results from the change in distance between the probe and the target is avoided. Such a device would need to have a gain that varied as a function of its input so as to compensate for the change in gain caused by the variation in probe capacitance.

BRIEF SUMMARY OF THE INVENTION

A nonlinear current mirror for loop-gain control incorporates a resistor in one section of a current mirror which produces a nonlinear transfer function for the current mirror. When the nonlinear current mirror is included as part of a capacitive displacement gauge, the gain of the gauge varies as a function of the input to the gauge, which compensates for the change in gain caused by the probe capacitance. Accordingly, the distance range and/or the frequency response of the capacitive displacement gauge is increased.

BRIEF DESCRIPTION OF THE SEVERAL VIEWS OF THE DRAWING

The invention will be more fully understood from the following detailed description taken in conjunction with the accompanying drawings in which:

FIG. 1 is a block diagram of a prior art capacitive displacement gauge;

FIG. 2 is a schematic diagram of a prior art current mirror;

FIG. 3 is a schematic diagram of the nonlinear current mirror of the present invention;

DETAILED DESCRIPTION OF THE INVENTION

Figure 4:
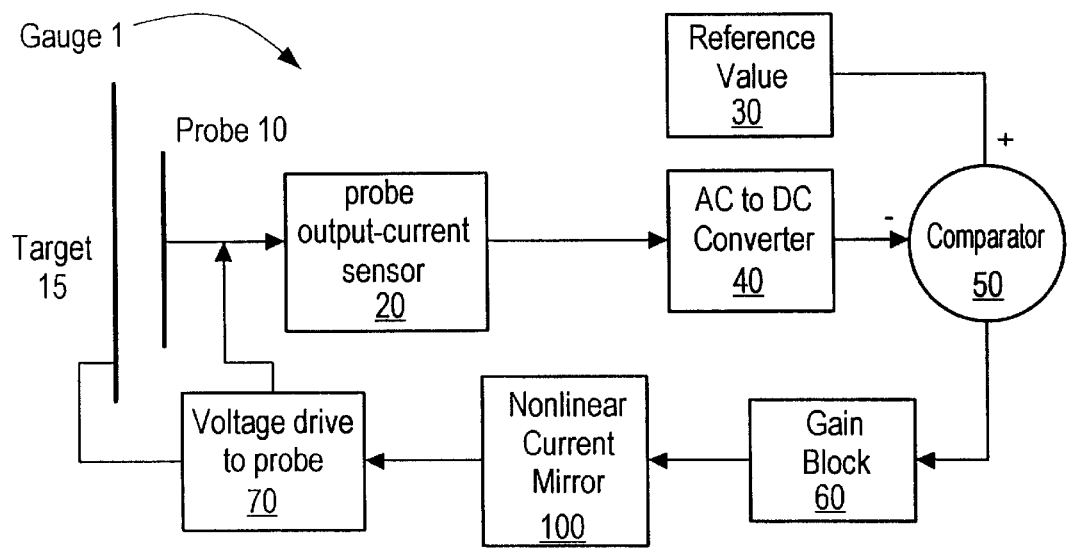
FIG. 4 is a block diagram of a capacitive displacement gauge incorporating a nonlinear current mirror of the present invention.

The capacitance between a probe of a capacitive displacement gauge and a target can be expressed as that of an ideal parallel plate capacitor according to the Equation 1:

$$C = \epsilon_o A/d \tag{1}$$

where C=capacitance in Farads
A=sensor area in $M^2$
$\epsilon_o$=permittivity of free space (8.85 F/M)
d=distance between the plates The relationship between a voltage across a capacitor and the current through the capacitor can be expressed simply as follows in Equation 2:

$$V = I/sC \tag{2}$$

where V=voltage across capacitor
I=current through capacitor
s=complex frequency variable
C=capacitance Since the phase of the signal is of no concern in this application, Equation 2 is simplified by eliminating the complex frequency variable, resulting in Equation 3:

$$V = I/C \tag{3}$$

Combining Equation 1 with Equation 3 yields Equation 4:

$$V = Id/\epsilon_o A \tag{4}$$

From Equation 4 when the capacitive displacement gauge is driven with a constant current, the voltage V across the capacitor is proportional to the distance d between the probe and the target. Equation 4 is rearranged to show that when a capacitive displacement gauge is driven at a constant voltage, the current through the gauge will vary as a reciprocal of the distance d between the probe and the target.

$$I = V\epsilon_o A/d \tag{5}$$

Referring now to FIG. 1, a block diagram is shown which illustrates a prior art capacitive displacement sensor 1. The "voltage drive to probe" 70 develops an A.C. voltage (excitation voltage) across the probe and target. The block 20 labeled "probe output-current sensor" represents the means by which the current through the probe is measured. The block 40 labeled "AC to DC converter" represents a circuit operative to change the A.C. probe output signal to a proportional D.C. value. Such circuits could include, but are not limited to, synchronous demodulators or diode rectification circuits. The block 50 labeled "comparator" compares the output of the AC to DC converter to a reference signal and provides an output indicative of the difference between the output of the AC to DC converter and the reference signal. The block 60 labeled "gain block" provides appropriate gain and phase characteristics for the loop formed by connecting the output of the gain block 60 to control the voltage-drive block 70. The loop functions to make the value at the output of the rectifier block 40 equal to the reference value 30. Thus, the probe's output current is held constant. The voltage mesured between the probe and the target is then measured. This measured voltage varies linearly with the spacing between the probe 10 and the target 15.

The circuit of FIG. 1 by no means represents the only way to accomplish the goal of driving a capacitive probe at constant current. Additional gain blocks could be used or the gain could be applied at a different place in the loop; the output-current sensor and rectifier could be one in the same device; the rectifier could be eliminated and the whole circuit could work at the excitation frequency of the probe.

Other differences are also possible.

By inspection of FIG. 1 the loop equation for FIG. 1 is shown in Equation 6:

$$(i_r - i_p) A t_v C_p = i_p \quad (6)$$

where $i_r$=reference value
$i_p$=d.c. representation of probe output current at output of AC to DC converter
A=gain of gain block
$t_v$=transfer function of probe drive block
$C_p$=probe capacitance The transfer functions of the probe current sensor 20 and AC to DC converter 40 are not shown because, for the purposes of this embodiment, they can be considered perfect. The parameter $C_p$ is the probe capacitance, and the current through the probe capacitance equals the excitation voltage multiplied by the probe capacitance per Equation 3. As such, $t_v C_p$ determines the amount of probe current which will result for a given control input to the probe drive block.

Rearranging terms to show the transfer function yield the following equation:

$$\frac{i_p}{i_r} = \frac{1}{1 + \frac{1}{A \tau_v C_p}}$$

Here, the transfer function is presented in standard form, and the open-loop gain of the loop is shown to be:

$$G = A t_v C_p \quad (7)$$

The open-loop gain of the capacitive displacement gauge is directly proportional to the probe capacitance, $C_p$. Since the probe operates over some distance range the loop gain of the gauge will change as the probe-to-target distance changes. The distance ratio will produce a capacitance ratio of the same magnitude. The changing loop gain of the gauge causes an undesirable change in the frequency response of the loop, thus limiting the range of the capacitive displacement gauge.

The circuitry of the capacitive displacement gauge can be slightly modified by the addition of a current mirror. Typically, a current mirror is designed to have an output current that is a fixed percentage of its input current. A classic 1:1 current mirror circuit 80 is shown in FIG. 2. Two transistors 81 and 85 are shown and are configured such that the base 82 of the first transistor 81 is in electrical communication with the base 87 of second transistor 85. The base 82 of the first transistor 81 is also in electrical communication with the collector 83 of first transistor 81 and functions as the input to the current mirror 80. The emitter 84 of first transistor 81 and the emitter 88 of second transistor 85 are connected to ground. The collector 86 of second transistor 85 functions as the output of the current mirror 80. As long as the two transistors 81 and 85 are matched and thermally bonded, the output current will equal the input current.

Referring now to FIG. 3 a nonlinear current mirror is shown. The current mirror shown in FIG. 2 has been modified by the insertion of a resistor 90 between the emitter 84 of first transistor 81 and ground. This addition of the resistor into the current mirror causes a nonlinear response. The nonlinearity is directly related to the relationship between the current through an ideal transistor and its base-emitter voltage ($V_{be}$). Equation 8 shows the relationship between a change in $V_{be}$ and a change in $i_c$ for an ideal transistor, such as, for instance, transistor 85 in FIG. 2.

$$V_{be1} - V_{be2} = (Kk/q) \ln(i_{c1}/i_{c2}) \quad (8)$$

where
k—Boltzmann's constant. 1.38E-23
q=charge of an electron, 1.6E-19
K—degrees Kelvin
$V_{bex}$=base-emitter voltage at time x
$i_{cx}$=collector current at time x Equation 9 expresses the change in $V_{be}$ for an ideal transistor 85 for the circuit of FIG. 3.

$$V_{beo1} - V_{beo2} = (Kk/q) \ln(i_{ic1}/i_{ic2}) + r(i_{ic1} - i_{ic2}) \quad (9)$$

$V_{beox}$=base-emitter voltage of output transistor at time x
$i_{icx}$=collector current of input transistor at time x In Equation 9, the assumption has been made that the $h_{fe}$ of the transistors 81 and 85 is high enough to allow the collector currents and emitter currents to be considered equal. Equations 8 and 9 are combined to form the following equation which defines the relationship between the input and output currents of the nonlinear current mirror 100.

$i_{cox}$ = output current
$i_{cix}$ = input current $$\frac{KT}{q} \ln\left(\frac{i_{co1}}{i_{co2}}\right) = \frac{KT}{q} \ln\left(\frac{i_{ci1}}{i_{ci2}}\right) + r(i_{ci1} - i_{ci2})$$

Solving the above equation for output current yields:

$$\frac{i_{co1}}{i_{co2}} = \frac{i_{ci1}}{i_{ci2}} \frac{e^{\frac{rq}{KT} i_{ci1}}}{e^{\frac{rq}{KT} i_{ci2}}}$$

Referring now to FIG. 4, in a particular embodiment of a capacitive displacement gauge, the nonlinear current mirror 100 is placed between the output of the gain block 60 and the input to the voltage-drive block 70. The nonlinear current mirror could be placed in more than one place in the feedback loop. Because matched, monolithic transistors are readily and cheaply available, and because the component count is so low, the nonlinear current mirror circuit can be conveniently and cheaply built, requiring a minimum amount of board space.

Using the same analysis that produced Equation 7, the open-loop gain with the current mirror is now:

$$G = A \tau_v (di_o/di_c) C_p \quad (10)$$

where: G=
open loop gain
A=gain of loop stages lumped together
$i_o$=output of nonlinear current mirror
$i_c$=input to nonlinear current mirror
$C_p$=probe capacitance As discussed previously, the probe current is linearly proportional to its drive voltage and the output of the current mirror is connected directly to the voltage-drive block 70. The probe current is expressed in Equation 11:

$$i_p = i_o \tau_v C_p \quad (11)$$

Solving Equation 11 for $C_p$ and substituting the result into Equation 10 yields:

$$G = \frac{A \frac{di_o}{di_c} i_p}{i_o}$$

The feedback loop functions to keep $i_p$ constant, and the gain stages represented by the variable A are constant. Therefore, the loop gain is constant when $di_o/(di_c i_o)$ is made constant.

A particular example is described below which shows that incorporating a nonlinear current mirror as part of the feedback loop provides a nonlinear transfer function such that the change in frequency response of the capacitive displacement gauge is avoided. For this example the following values are utilized:

$k = 1.38 \times 10^{-23}$ (Boltzmann's constant)
$T = 300°$ C.
$V_{be} = 0.600$ volts@$i_c = 1$ mA
$q = 1.6 \times 10^{-19}$ coulomb (charge of electron)
$i_i = 2$ to 3.2 mA (range of currents into input of current mirror)
$R = 20$ ohms (resistor in nonlinear current mirror)

Figure 5:
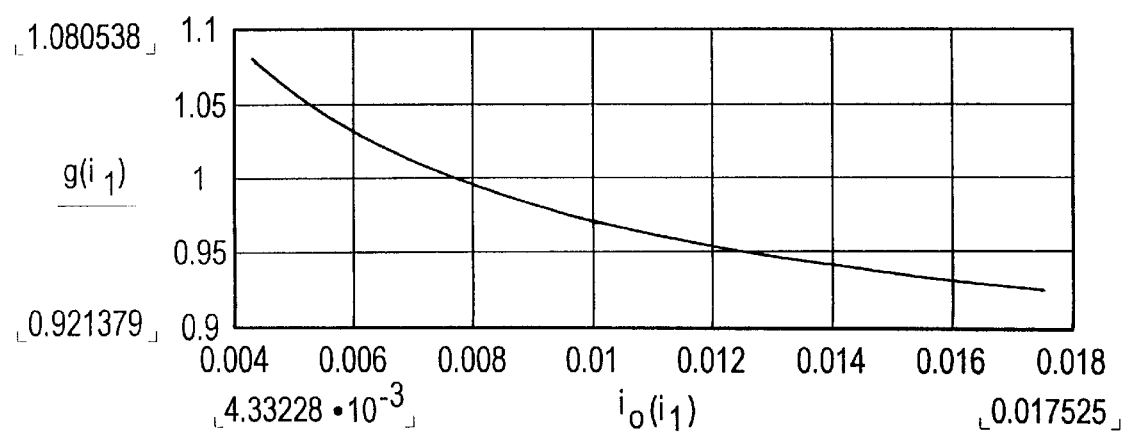
FIG. 5 is a graph of the output current versus the input to a capacitive displacement gauge incorporating the nonlinear current mirror of the present invention.

The calculations were performed by MathCAD, and the graph of FIG. 5 shows the variation in $di_o/(di_c i_o)$ normalized to an average value of approximately one. In the ideal case, this value would be constant. The results show that while the output current (shown on X axis) varies over a ratio of 4:1 (which, without the nonlinear element, would also cause the open-loop gain to vary by 4:1), the graphed loop gain (shown on the Y axis) response varies over a ratio of only 1.17:1, which is very close to the ideal value of unity.

This analysis shows that, by the addition of a single resistor, a standard current mirror is modified to provide a nonlinear response that produces close to the ideal loop gain response when the modified (nonlinear) current mirror is used in a capacitive displacement gauge, thereby increasing the range of the capacitive displacement gauge.

Having described preferred embodiments of the invention it will now become apparent to those of ordinary skill in the art that other embodiments incorporating these concepts may be used. Accordingly, it is submitted that the invention to should not be limited to the described embodiments but rather should be limited only by the spirit and scope of the appended claims.

I claim:

1. A capacitive displacement gauge comprising:
   a probe;
   a probe output-current sensor electrically connected to said probe;
   an AC to DC converter electrically connected to said probe output current sensor;
   a comparator electrically connected to said AC to DC converter and a reference value;
   a gain block electrically connected to said comparator;
   a nonlinear current mirror electrically connected to said gain block; and
   a voltage drive to probe circuit in electrical communication with said nonlinear current mirror, said probe and a target.

2. The capacitive displacement gauge of claim 1 wherein said AC to DC converter comprises a demodulator.

3. The capacitive displacement gauge of claim 1 wherein said AC to DC converter comprises a rectifier.

4. The capacitive displacement gauge of claim 1 wherein said nonlinear current mirror comprises:
   a first device having a first signal electrode, a second signal electrode and a control electrode, wherein the second signal electrode of said first device is operative as a current input, the control electrode of said first device is electrically connected to the second signal electrode of said first device, and the first signal electrode is in electrical communication with a reference voltage with a resistor therebetween; and
   a second device having an first signal electrode, a second signal electrode and a control electrode wherein the second signal electrode of said second device is operative as a current output, the control electrode of said second device is in electrical communication with said control electrode of said first device and the first signal electrode of said second device is in electrical communication with a reference voltage.

5. The capacitive displacement gauge of claim 4 wherein said reference voltage is approximately zero volts.

6. The capacitive displacement gauge of claim 1 wherein said nonlinear current mirror comprises:
   a first transistor having an emitter, a base and a collector, wherein the collector of said first transistor is operative as a current input, and the base of said first transistor is electrically connected to the collector of said first transistor;
   a second transistor having an emitter, a base, and a collector, wherein the collector of said second transistor is operative as a current output, the base of said second transistor is electrically connected to said first transistor base, and the emitter of said second transistor is electrically connected to a reference voltage; and
   a resistor having a first contact and a second contact, the first contact of said resistor electrically connected to the emitter of said first transistor, the second contact of said resistor electrically connected to the reference voltage.

7. The capacitive displacement gauge of claim 6 wherein said first transistor and said second transistor are monolithic.

8. The capacitive displacement gauge of claim 6 wherein said first transistor and said second transistor are matched.

9. The capacitive displacement gauge of claim 6 wherein said first transistor and said second transistor are thermally bonded to each other.

* * * * *

UNITED STATES PATENT AND TRADEMARK OFFICE
CERTIFICATE OF CORRECTION

PATENT NO.    : 6,181,142 B1
DATED         : January 30, 2001
INVENTOR(S)   : Roy E. Mallory It is certified that error appears in the above-identified patent and that said Letters Patent is hereby corrected as shown below:

Column 4,
Lines 57-58, "where: G =
             open loop gain" should read as follows:
-- where:  G=open loop gain --;

Column 5,
Lines 48-49, "electrically connected to said probe;" should read
-- in electrical communication with said probe; --;

Column 6,
Lines 1-2, "in electrical communication with" should read -- electrically connected to --;
Line 14, "is electrically connected to" should read -- is in electrical communication with --;
Line 16, "in electrical communication with" should read -- electrically connected to --;
Line 23, "is in electrical communication with" should read -- is electrically connected to --;
Lines 25-26, "in electrical communication with" should read -- electrically connected to --;
Lines 42-43, "to the emitter" should read -- to communication with the emitter --; and
Line 48, "are matched." should read -- are thermally bonded to each other. --.

Signed and Sealed this

Fifteenth Day of June, 2004

JON W. DUDAS
*Acting Director of the United States Patent and Trademark Office*